Feb. 28, 1928.
R. J. WILSON
CRANK PIN REFINISHING TOOL
Filed Dec. 14, 1925
1,660,539
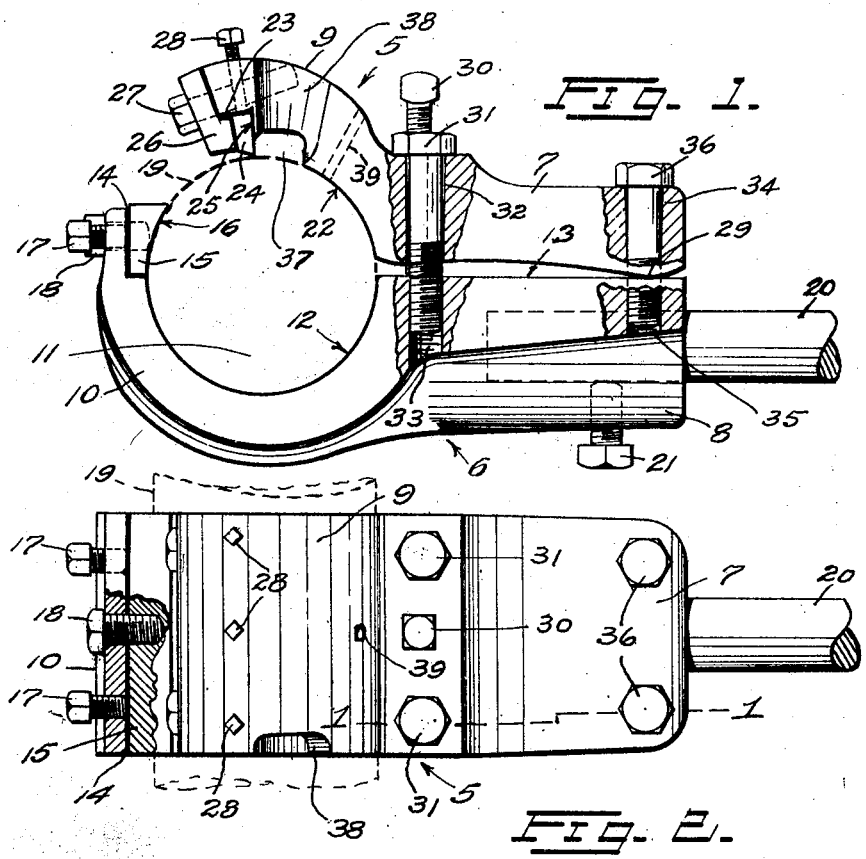
Fig. 1.
Fig. 2.
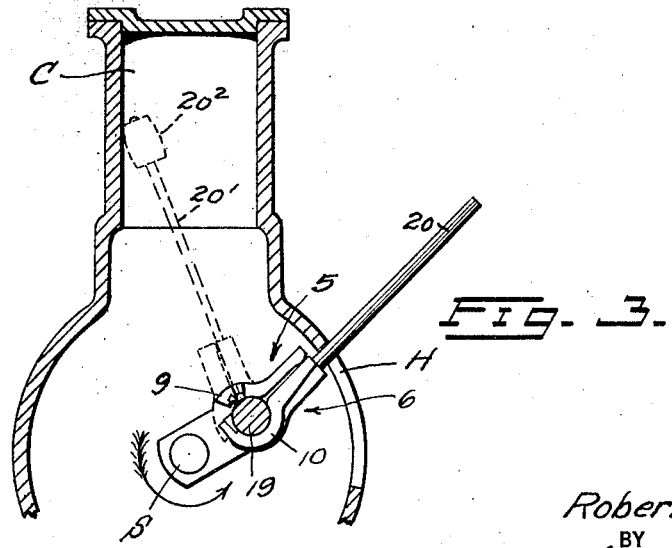
Fig. 3.
INVENTOR:
Robert J. Wilson
BY
*Pierre Barnes*
ATTORNEY Patented Feb. 28, 1928.

1,660,539

UNITED STATES PATENT OFFICE.

ROBERT J. WILSON, OF SEATTLE, WASHINGTON.

CRANK-PIN-REFINISHING TOOL.

Application filed December 14, 1925. Serial No. 75,412.

This invention relates to a cutting tool for truing-up or re-finishing cylindrical bodies and, more especially, crank-pins of the crank shafts of reciprocating engines.

The object of the invention, generally stated, is the provision of a tool of this character which is easy to adjust, efficient in operation and capable of being employed upon a shaft while in place in the engine bearings.

More specific objects and advantages of the invention will appear in the following description.

The invention consists of a bifurcated stock carrying an adjustable cutting blade, said stock comprising two complementary members arranged to straddle the work, and novel means for regulating the tool to cause the same to be held in position to most effectually and accurately perform its function.

The invention further consists in the novel construction, adaptation and combination of parts hereinafter described and claimed.

In the accompanying drawing,—

Figure 1 is a side elevation of a tool embodying the present invention, shown partly in section on broken line 1—1 of Fig. 2. Fig. 2 is a plan view of Fig. 1 shown partly in section. Fig. 3 is a side elevation of the tool applied to the shaft of an engine, said shaft and a portion of the engine structure being shown in transverse vertical section.

In said drawing, the reference numerals 5 and 6 represent the upper and lower members respectively of the body or stock of my improved cutting tool. Said members are respectively provided with shank elements 7 and 8, integral with jaw elements 9 and 10 which are disposed at one end of the stock and in opposed relation with each other.

The jaw element 10 of the lower member 6 is provided with a semi-cylindrical cavity 11 of a radius equal to that of the largest crank pin with which the tool is to be employed.

The axis of the inner peripheral surface 12 of the jaw 10, or of the cavity 11, is in a plane with the upper surface 13 of the shank 8, or nearly so, of the lower member.

In the outer end of the jaw 10 and in the inner side thereof is a recess 14 which is located above the plane of the cavity axis. Provided within said recess is a block, or gib, 15 having a concave inner surface 16 corresponding to the curvature of the jaw surface 12.

This gib is regulated by means of set screws 17 extending through threaded holes in the jaw 10 and engaging against the gib near each end thereof, see Fig. 2, in cooperation with a clamping screw 18 extending through a hole in the jaw to engage in a threaded hole provided in the gib. The gib is removable for the admission and removal of the crank pin 19 into and from the cavity 11 of the lower jaw and, when the gib is secured by said screws to have its concave surface bear against the crank pin, it serves rotatively to connect the lower member 6 of the tool to the pin and also cooperates with the cavity surface 12 to afford bearings to maintain the lower member firmly to the crank-pin. The gib 15 is, moreover, adjustable to accommodate crank pins of different diameters. 20 represents a bar handle socketed in a hole provided in the shank 8 of the lower member and is detachably held in place as by means of a set screw 21.

The jaw 9 of the upper member 5 is provided with a concave lower surface 22 having substantially the same radius as that of the opposing surface 12 of the lower jaw.

At its outer end the jaw 9 is provided in its under side with a recess 23 to receive a cutting blade 24 which is held against the rear surface 25 of such recess by means of a clamping plate 26 and screw bolts 27 extending through the plate into screw threaded holes in the upper jaw. 28 represents set screws extending through the jaw 9 into the recess for regulating the position of the cutting blade with respect to the work.

In proximity of its outer end, one of the shanks 7 or 8 is provided with a transversely disposed convex ridge 29, which is herein illustrated on the shank 7 of the upper member and seating against the plane surface 13 of the shank 8 of the lower member. Said ridge and its bearing upon the surface 13 constitutes a fulcrum or support about which the two jaws 9 and 10 may be swung toward or from each other subject to a set screw 30 and screw bolts 31 passing through funnel shaped holes such as 32 provided in the upper member to engage in threaded holes such as 33 provided in the shank of the lower member.

The set screw 30 and securing bolts 31 are located in proximity with the jaw end of the tool. To render the connection between the two members more rigid I employ, desirably, two additional securing screw bolts 36 which are disposed medially of the width of the ridge 29, such bolts extending through funnel shaped holes, as 34, in one of the members to engage in screw threaded holes, as 35, provided in the other member.

37 represents a groove disposed along side of the cutting blade 24 transversely of the tool in the under side of the jaw 9 for the reception of metal cuttings from the work. At one side of the jaw there is advantageously provided a sight opening 38 extending through the jaw 9 into said groove whereby the operator may observe the action of the cutting blade.

This sight aperture is also utilized to supply oil to the work. One or more oil holes such as 39 are preferably employed to supply a lubricant to the periphery of the pin 19.

The manner of applying the tool to a crankpin will be apparent from the foregoing description. The tool is mounted upon the crankpin 19 of an engine shaft as shown in Fig. 3. Where there is a hand hole H or other opening in the side of the engine's crank case, the tool is most conveniently employed in the position in which it is represented by full lines in Fig. 3— that is to say, with the handle 20 extending through the hand hole to be held in the hands of the operator. When such a hand hole is not available, the tool may be used in its dotted line position (Fig. 3) with the handle extending up as indicated by $20^1$ into the cylinder bore C, in which case a block $20^2$ of wood or an equivalent soft material may be mounted upon the handle to prevent the scarring of the cylinder wall as the tool reciprocates up and down when the crankpin is revolved in the direction indicated by the arrow in Fig. 3.

When in use the tool is mounted upon the crankpin and is adjustably connected thereto by means of the screws 30 and 31, which may also be employed to regulate the operative position of the cutting blade after the latter has been primarily adjusted by means of the screws 28 and secured to the jaw 9 by means of the clamping plate 26.

The tool is held against transverse tilting by the surface 12 of the lower jaw which bears against the work, acting in conjunction with the surface 22 of the upper jaw and also in connection with the cutting blade itself bearing against the work. The two jaws are maintained in suitable relations with respect to each other by means of the transverse ridge 29 cooperating with the screws 36, said ridge at one end of member 5 also acts, in effect, as a hinge bearing with respect to an end of the member 6 which permits the adjustment of the jaws at the opposite ends of the respective members in relation with each other.

What I claim, is,—

1. A crankpin re-finishing tool comprising two complementary body members each having a concave jaw-element at one end of the tool, means rigid with one of said members and located in proximity to the end of the tool most distant from the respective jaw element for retaining the respective members at such end of the tool in spaced apart relation, screw bolts located between said means and the jaws for securing the members together and cooperating with said members for retaining the jaw elements thereof in adjusted spaced apart relation with respect to each other, the outer end of each jaw being provided with a recess disposed transversely of the tool, a gib provided in one of said recesses and detachably secured to one of said members and cooperating with such member exclusively of the other member for connecting the tool to a crankpin for rotative movement, a cutting blade provided in the recess of the other jaw, means for adjustably moving said cutting blade, and means for clamping the cutting blade in adjusted position to the respective jaw.

2. In a crankpin re-finishing tool, the combination with a member having a shank at one end and a concave jaw at its other end, a gib detachably connected to one side of said jaw, the combined lengths of the concave surface of said jaw and the length of the gib circumferentially of the crankpin being greater than one-half of the circumference of the crankpin, and means for regulating said gib to coact with the jaw for rotatively connecting the tool to the crankpin, of a cutting blade, a second member provided near one end thereof with a recess to receive said cutting blade, means for securing the cutting blade in adjusted relation to said second member, and bolts extending through one of the members and engaging the other member for detachably securing said members together, said last named means being located at one side of the jaws.

3. A crankpin re-finishing turning tool comprising two members each having a concave jaw at one end and a shank element at its other end, a gib detachably secured to one of said jaws and cooperating therewith for rotatably connecting the entire tool to the crankpin, one of said members being formed with a transversely disposed ridge to provide at the outer end of its shank a rocker bearing against the opposing surface of the shank of the other member, a cutting blade connected to one of said jaws, screw devices provided in the shank of one of said members in proximity to the respective jaw for regulating the relative positions of the jaws with respect to each other, and screw devices disposed in spaced apart relation longitudinally of the shank elements of both members for coupling the same in adjusted relation with each other.

Signed at Seattle, Washington, this 10th day of November, 1925.

ROBERT J. WILSON.